A. Randel,
Oil Press.

Nº 34,722. Patented Mar 18, 1862.

Witnesses: Inventor.

UNITED STATES PATENT OFFICE.

A. RANDEL, OF NEW YORK, N. Y., ASSIGNOR TO JOHN J. ECKEL, OF SAME PLACE.

IMPROVEMENT IN MODE OF EXTRACTING OIL, TALLOW, &c.

Specification forming part of Letters Patent No. 34,722, dated March 18, 1862.

*To all whom it may concern:*

Be it known that I, A. RANDEL, of the city, county, and State of New York, have invented a new and useful Improvement in Presses for Expressing Oil, Tallow, and other Grease from the Substances which Contain them; and I do hereby declare that the following is a full, clear, and exact description of the same, reference being had to the annexed drawings, making a part of this specification, in which—

Figure 1:
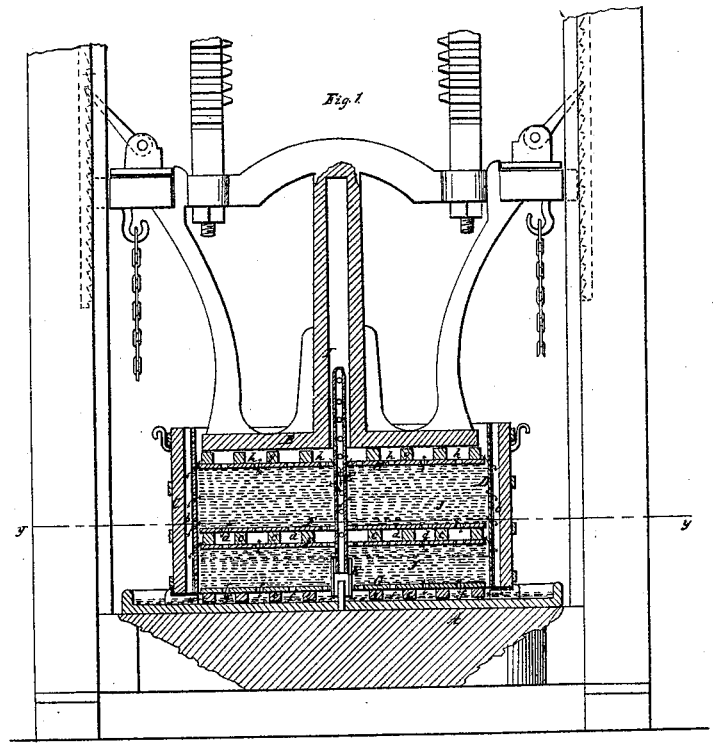
Figure 2:
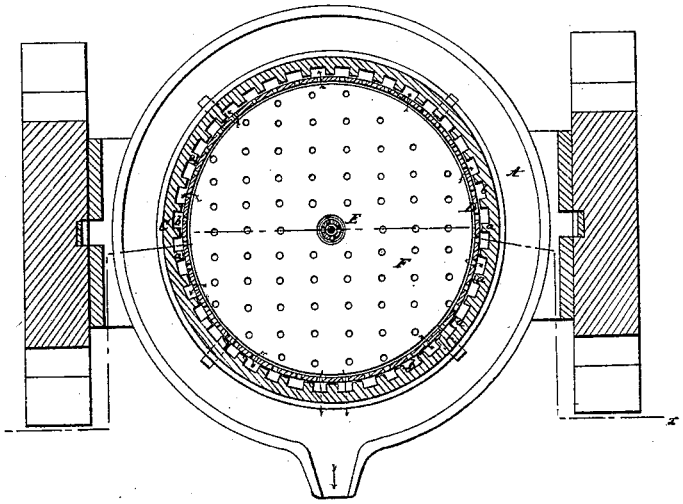

Figure 1 is a vertical central section of my invention, taken in the line $x\,x$, Fig. 2; Fig. 2, a horizontal section of my invention, taken in the line $y\,y$, Fig. 1.

Similar letters of reference indicate corresponding parts in the two figures.

The object of this invention is to afford a more ready means than has been hitherto provided for the exit or escape of the oil or other grease from the substance under compression, and thereby not only effect a saving in power, but also cause the work to be performed in a much more thorough manner than usual.

The invention consists in combining a perforated and a solid curb or press-box with perforated horizontal plates and a perforated central discharge-tube, all constructed and arranged, as hereinafter described, to effect the desired result.

To enable those skilled in the art to fully understand and construct my invention, I will proceed to describe it.

A represents the bed of a press, and B the plunger or follower, which may be operated by any proper means.

C is a cast-metal curb or hollow cylinder, which is placed on the bed A, and is provided with vertical ribs $a$ at its inner side. These ribs are at equal distances apart, and may be cast with the curb or cylinder, all in one piece.

C' are wrought-iron hoops or bands shrunk upon the outside of the cylinder C, to give it additional strength.

D is a perforated cylinder, which may be of rolled sheet metal of a suitable thickness. This perforated cylinder D is fitted within the curb or cylinder C, and is in contact with its ribs $a$, the spaces $b$ between the ribs serving as channels for the escape of the oil or grease, as will be presently shown.

E is a vertical perforated tube, which is placed centrally within the cylinder D, and F F are two perforated plates, which are secured to parallel bars $c$, the spaces $d$ between said bars also serving as channels for the escape of oil or grease, the plates F F being placed horizontally within the perforated cylinder D and at about the center of the substance to be compressed. (See Fig. 1.)

G is a perforated plate, which is placed horizontally at the bottom of cylinder D, said plate resting on the bed A, or rather its bars $e$ resting on the bed, which bars are attached to the under side of the plate G, the spaces $f$ between the bars $e$ forming escape-passages for the oil or grease. A similar perforated plate H is placed on the top of the substance to be compressed, the plate H having bars $g$ attached to its upper surface, the passages H between forming escape-passages for the oil or grease.

E' is a short vertical tube secured in the center of the plate G, to receive and sustain the lower end of the tube E.

The plunger-rod I is hollow to receive the perforated tube E as the plunger descends.

The operation is as follows: The plunger B is elevated above the curb C and perforated cylinder D, and the lower perforated plate G is placed within the cylinder D, and a quantity of the substance J to be compressed is placed in the cylinder D, the latter being rather more than half-filled. The plates F F are then placed in the cylinder D, the perforated tube E passing through their center, and the cylinder D is then completely filled with the substance J. The plunger B is then forced down on the substance J and the latter compressed within the cylinder D. As the substance J is compressed, the oil and grease escape through the passages $d$ to the central tube E and to the perforated cylinder D, a free communication being allowed between the cylinder D and tube E. The passages $f$ between the bars $e$ of the lower plate G and the passages $h$ between the upper bars $g$ afford also a similar communication, and hence the oil or grease has a free escape from the substance J, the vertical passages $b$ between the ribs $a$ affording an escape for the oil or grease at the outer side of cylinder D, the oil or grease that passes into the central tube E escaping from its lower end.

The solid cast-metal cylinder or curb C, with strong wrought-iron bands shrunk upon its periphery, is essential in order to support cylinder D under the pressure to which it is subjected internally.

I do not claim the central perforated tube E, nor do I claim a perforated cylinder D when separately considered; but I do claim as new and desire to secure by Letters Patent—

An oil-press consisting of a bed A, hollow plunger B I, solid ribbed curb C a, surrounded by bands C', shrunk upon its periphery, perforated cylinder D, perforated central discharge-tube E, supporting tube E', perforated plates F, G, and H, and bars c e g, all constructed, combined, and arranged in the manner and for the purposes hereinbefore explained.

A. RANDEL.

Witnesses:
M. M. LIVINGSTON,
WM. A. CROMWELL.